(12) United States Patent
Eibach et al.

(10) Patent No.: US 7,392,391 B2
(45) Date of Patent: Jun. 24, 2008

(54) SYSTEM AND METHOD FOR SECURE CONFIGURATION OF SENSITIVE WEB SERVICES

(75) Inventors: Wolfgang Eibach, Holzgerlingen (DE); Matthias Gruetzner, Schoenaich (DE); Dietmar Kuebler, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 10/242,129

(22) Filed: Sep. 12, 2002

(65) Prior Publication Data

US 2003/0084350 A1      May 1, 2003

(30) Foreign Application Priority Data

Nov. 1, 2001   (EP) ................... 01126098

(51) Int. Cl.
*G06F 11/30* (2006.01)
*H04L 9/00* (2006.01)

(52) U.S. Cl. .................. 713/175; 713/713; 713/191; 709/223

(58) Field of Classification Search ............... 713/173, 713/175; 709/223
See application file for complete search history.

(56) References Cited

U.S. PATENT DOCUMENTS

| | | | |
|---|---|---|---|
| 6,662,187 B2* | 12/2003 | Barnett et al. ............... 707/101 |
| 6,785,723 B1* | 8/2004 | Genty et al. ................. 709/224 |
| 6,968,334 B2* | 11/2005 | Salmenkaita et al. .......... 707/10 |
| 2002/0032790 A1* | 3/2002 | Linderman ................... 709/230 |
| 2002/0046239 A1* | 4/2002 | Stawikowski et al. ........ 709/203 |
| 2002/0156872 A1* | 10/2002 | Brown ........................ 709/219 |
| 2002/0161826 A1* | 10/2002 | Arteaga et al. .............. 709/203 |
| 2002/0169961 A1* | 11/2002 | Giles et al. .................. 713/175 |

OTHER PUBLICATIONS

Ernesto et al, Fine Grained Access Control for SOAP E-Services, WWW 10, May 1-5, 2001, Hong Kong, pp. 504-513.*

* cited by examiner

*Primary Examiner*—Nasser Moazzami
*Assistant Examiner*—Fikremariam Yalew
(74) *Attorney, Agent, or Firm*—Jeanin Ray-Yarletts, Esq.; Steven M. Greenberg, Esq.; Carey Rodriguez Greenberg & Paul LLP

(57) ABSTRACT

The present invention discloses a system and method for configuration of access rights to sensitive information handled by a sensitive Web-Service. In a case of requested configuration changes initiated by the client system the Web-Server system provides a configuration data file to the client system preferably using a SOAP-communication protocol. The changes of the configuration data file are exclusively performed offline at the client side and the updated configuration data file is signed with authentication information and sent as a part of a SOAP-request to the Web-Server system. The Web-Server system provides a filter component for identifying and discarding non-SOAP requests as well as an access control manager for providing authentication examination for incoming SOAP-requests. After successful passing these components the SOAP-request is used for updating the existing configuration data file.

20 Claims, 8 Drawing Sheets

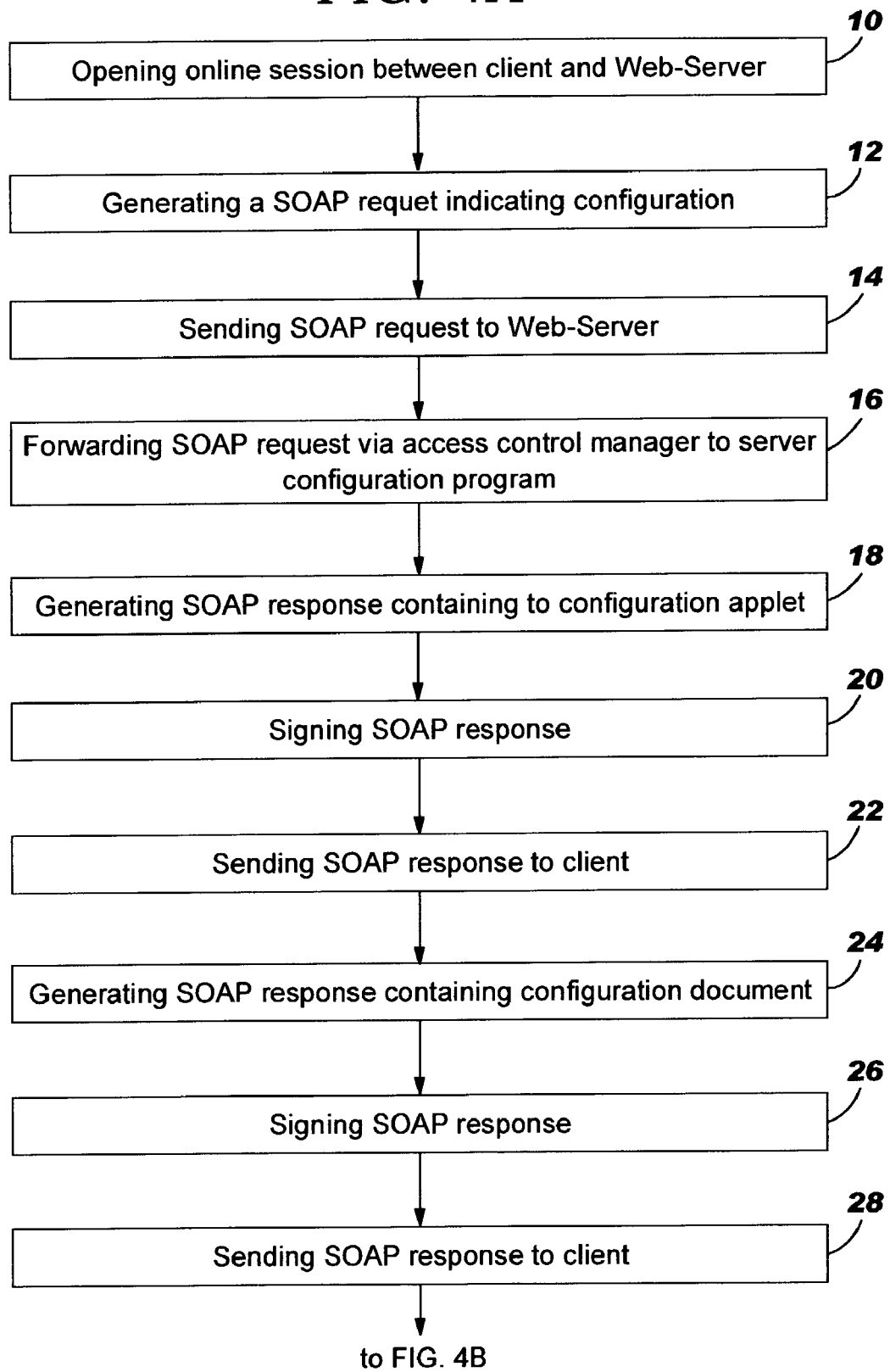

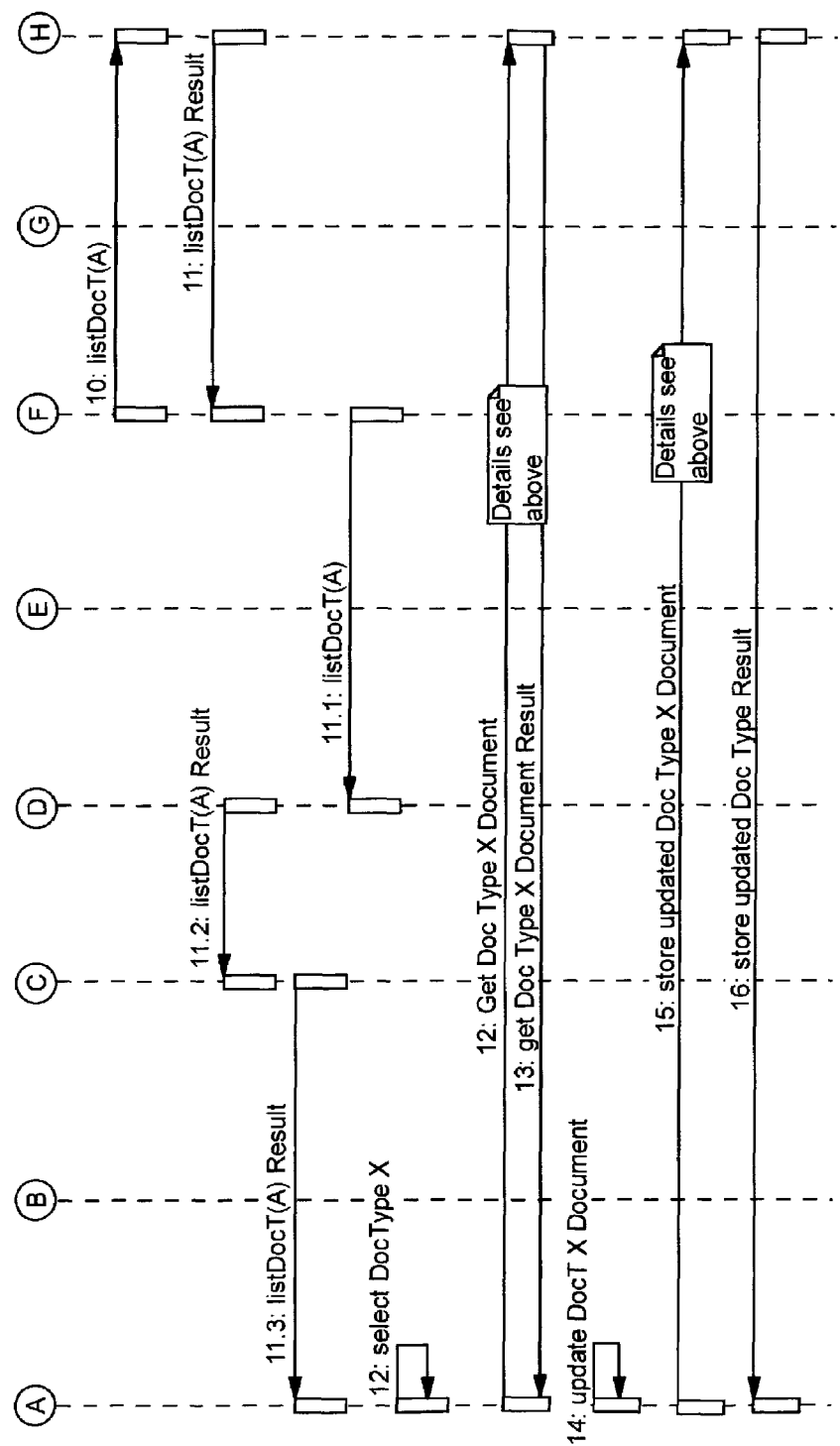

SYSTEM AND METHOD FOR SECURE CONFIGURATION OF SENSITIVE WEB SERVICES

The present invention relates to secure configuration of access rights to sensitive information and more particular to secure configuration of access rights to sensitive information handled by a sensitive Web-Service especially by a secure electronic vault Web-Service.

In the prior art a well-known system for storing sensitive information is the "secure electronic vault". The secure electronic vault may be defined as a secure data store that allows users to securely store their sensitive information into a remote data store and customize the access rights to that sensitive information by means of a configuration program. Sensitive information may be any information like contracts, legal documents, passwords, debit card numbers, bills, receipts etc. Configuration of a secure electronic vault running at a remote Web-Server requires a login of the client to the Web-Server and the client typically starts a configuration program for doing the required changes of the access rights to the secure electronic vault.

The communication between client and Web-Server is typically based on the Hypertext Transfer Protocol (HTTP). Usually HTTP takes places over TCP/IP (Transmission Control Protocol/Internet Protocol). A HTTP request consists of the HTTP method, e.g. GET, HEAD, POST, the Universal Resource Identifier (URI), the protocol version and an optional supplemental information. The method is executed on the object named by the URI. The connection is established by the client prior to the request and terminated by the Web-Server after the response is transmitted.

HTTP requires a permanent online-communication between client and Web-Server that simultaneously implies security issues taking into consideration that Web-Servers are often intruded by unauthorized user, e.g. Hacker, who can manipulate files or configuration data at the Web-Server side. This applies accordingly to Web-Servers with the latest firewall technology.

SUMMARY OF THE PRESENT INVENTION

It is therefore an object of the present invention to provide a system and method for configuration of access rights to sensitive information without having the security problems of the prior art.

This object is solved by the features of the independent claims. Further embodiments of the present invention are laid down in the dependent claims.

The present invention discloses a system and method for configuration of access rights to sensitive information handled by a sensitive Web-Service. In a case of requested configuration changes initiated by the client system the Web-Server system provides a configuration data file to the client system preferably using a SOAP-communication protocol. The changes of the configuration data file are exclusively performed offline at the client side and the updated configuration data file is signed with authentication information and sent as a part of a SOAP-request to the Web-Server system. The Web-Server system provides a filter component for identifying and discarding non-SOAP requests as well as an access control manager for providing authentication examination for incoming SOAP-requests. After successfully passing these components the SOAP-request is used for updating the existing configuration data file.

BRIEF DESCRIPTION OF THE DRAWINGS

The novel features characteristic of the invention are set forth in the appended claims. The invention itself, however, as well as a preferred mode of use, further objects and advantages thereof, will best be understood by reference to the following detailed description of an illustrative detailed embodiment and when read in conjunction with the accompanying drawings, wherein:

FIG. 1 shows the basic structure of the prior art SOAP-Web-Service architecture on which the present invention is preferably based.

DETAILED DESCRIPTION OF THE PREFERRED EMBODIMENT

A new technology is currently evolving in the Internet, the so called Web-Services. Web-Services may be defined as providing existing or new e-business services into a service-oriented architecture (SOA). These Web-Services are normally offered by independent Service-Providers to support other Internet users in managing their Internet activities. Examples of such services may be tax calculation for an online shop, payment handling for internet shops, document translation into various languages, or secure electronic vaults. To support these Web-Services in the Internet, a new architecture was defined, SOA, the Service Oriented Architecture. This new architecture describes how a Web-Service may be found by user and how a potential user can access such Web-Services.

The communication protocol for these Web-Services is also a newly defined protocol, called SOAP, that stands for Simple Object Access Protocol.

SOAP is a way for a program running in one kind of operating system (e.g. client) to communicate with a program in the same or another kind of an operating system (e.g. Web-Server) by using preferably the World Wide Web's Hypertext Transfer Protocol (HTTP) and the Extensible Mark-up Language (XML) as the mechanisms for information exchange. Since Web protocols are installed and available for use by all major operating system platforms, HTTP and XML provide an already at-hand solution to the problem of how programs running under different operating systems in a network can communicate with each other. SOAP specifies exactly how to encode an HTTP header and an XML file so that a program in one computer can call a program in another computer and pass it information. It also specifies how the called program can return a response.

Figure 1:
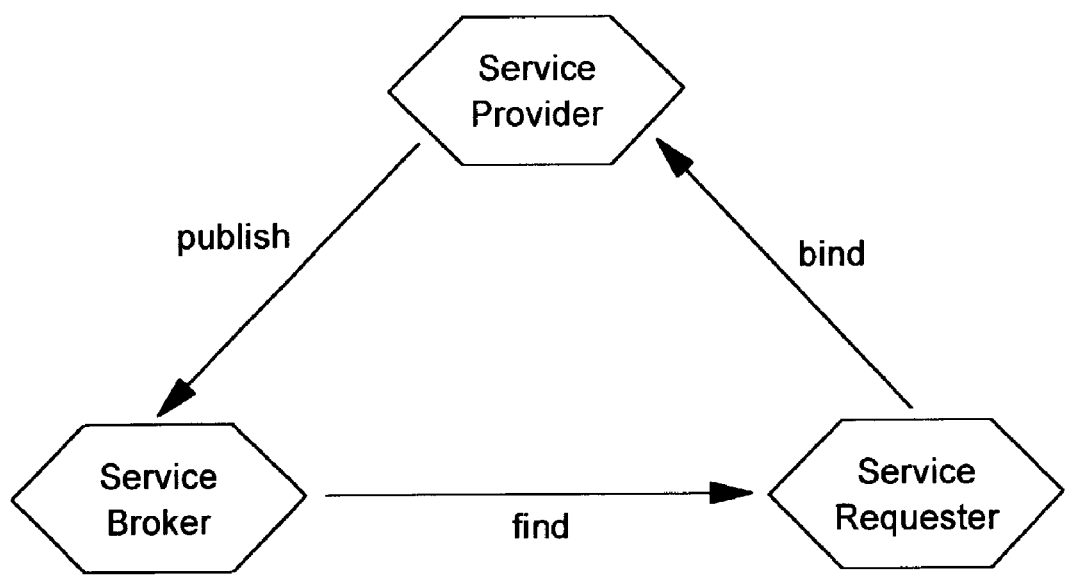
FIG. 1 shows the basic structure of a SOAP-Web-Service architecture on which the present invention is based.

The basic architecture of SOAP is shown in FIG. 1. The basic architecture comprises three components, the Service-Providers, the Service-Brokers, and the Service requesters.

The Service-Providers publish the availability of their Web-Services, the Service-Brokers register and categorize the published Web-Services and provide search services, and the Service Requesters using Service-Broker to find a needed Web-Service and then employing that Web-Service.

Figure 2:
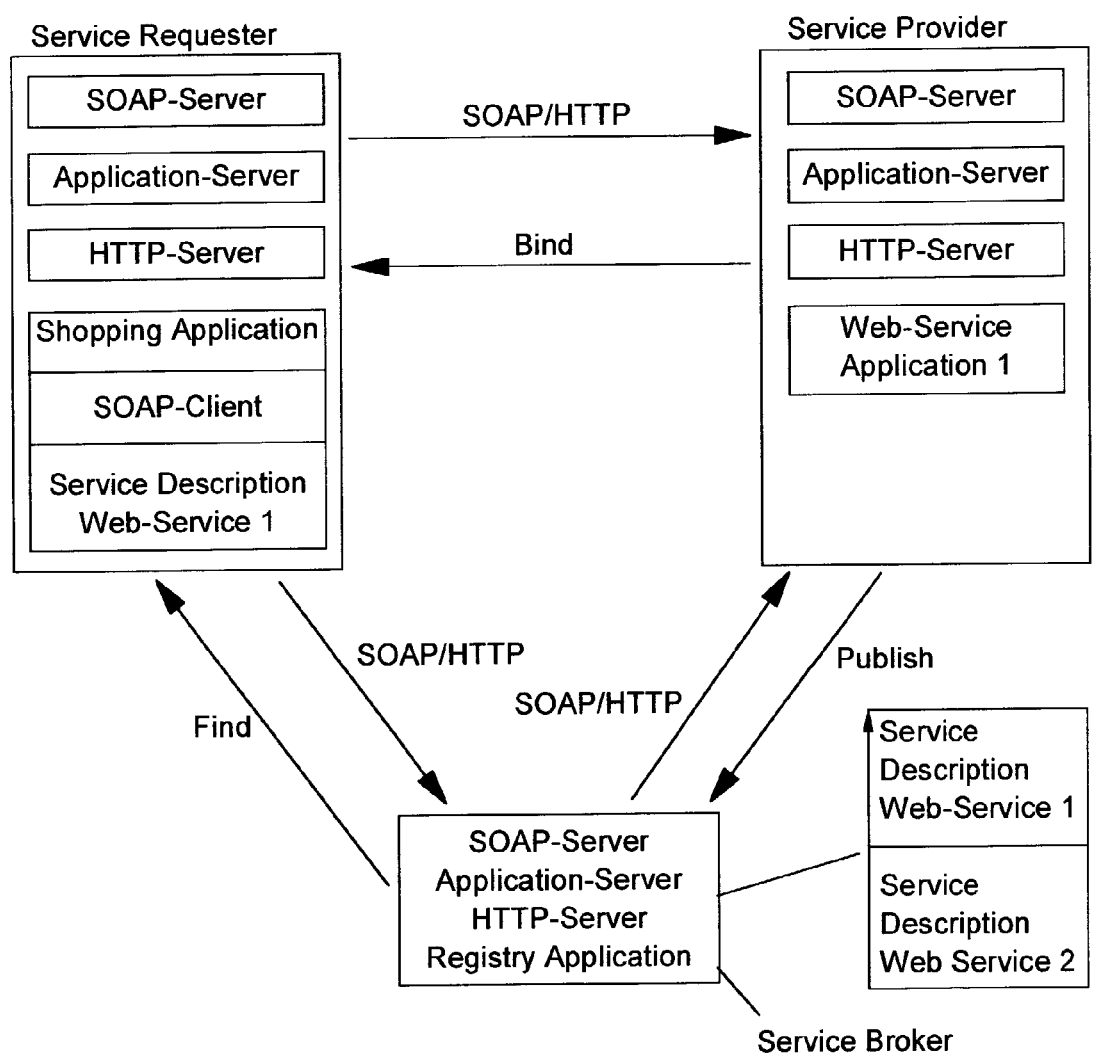
FIG. 2 shows an example for a typical SOAP-Web-Service-communication architecture as used by the present invention.

A typical SOAP-communication architecture as used by the prior art is shown in FIG. 2.

The Service-Provider offers a Web-Service, e.g. secure electronic vault Web-Service. Service-Providers publish their Web-Service to a Service-Broker. The Service-Provider knows the semantics of the Web-Service and publishes it in the right category in the Service-Broker's taxonomy. What is published by the Service-Provider, to the Service-Broker, is called a service description. Service descriptions are XML documents that describe the semantics and the message API (Application Programming Interface) of a certain Web-Service. For example, the service description for a secure electronic vault Web-Service may include the price of the service, availability, functionality, URL, IDL and so on. IDL, or Interface-Definition-Language, defines the input and output data required or provided by that Web-Service. Service requesters, knowing the Web-Service they need, ask the Service-Broker for a list of services in that category. A Service-Requester receives by SOAP-Find response a service description for the requested Web-Service. The Service Requester uses the IDL for converting the input data format generated by the shopping application into a data format required by the Web-Service and sends a SOAP-request containing the converted input data to the Web-Service. The Web-Service returns a SOAP response containing the result (output data), e.g. tax result, to the Service Requester.

Figure 3:
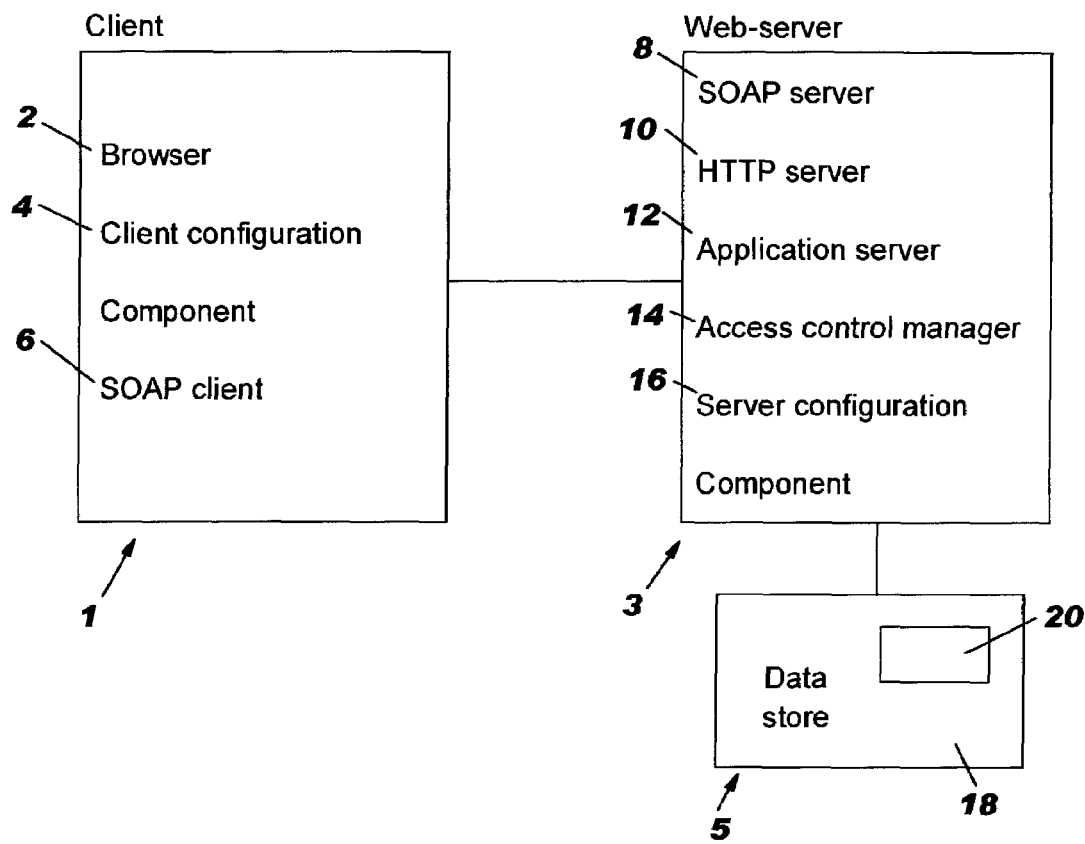
FIG. 3 shows the basic components for a secure configuration of a Web-Service in accordance with the present invention.

FIG.3 shows the basic architecture for a secure configuration of Web-Services in accordance with the present invention. The inventive architecture comprises at least a client 1 and a Web-Server system 3 connected with each other by Intranet or Internet. The Web-Server system preferably offers a sensitive Web-Service which may be for example a secure electronic vault 20 according to the present invention. Preferably, the secure electronic vault Web-Service 20 may provide all or few of the following functionalities: access to sensitive information only via SOAP request's, digital signature in the SOAP header for authentication, encryption of data, accept image data (pictures, biometrics ID's ), offer access to Certification Authority for verification, interface to Access Control Manager 14 to control access to the sensitive information, functions to allow customization access rights, different safe boxes for different types of sensitive information. Sensitive information may be any information, for example contracts, legal documents, passwords, debit card numbers, bills, receipts etc. The secure electronic vault Web-Service may be published to a Service-Broker and may be found by a Service-Requester (client) via a SOAP-Find response and may be bound by a SOAP-Bind response using the service description for execution of the requested secure electronic vault Web-Service. The Web-Server further comprises communication components 8, 10,12 for handling SOAP-requests and responses (e.g. HTTP-Web-Server, Application Web-Server, SOAP-Web-Server), a filter component for identifying and discarding predefined requests, a component 14 for handling authentication examination (Access control manager) for the requested Web-Service (Access Control Manager), and a component 16 for accessing configuration documents for specifying access rights to the Web-Service (configuration data file) and providing them via the SOAP-Web-Server 8 to the SOAP-client 6 communicating with a client application that provides service description information for accessing that Web-Service, and a data store 18 for storing sensitive information and configuration documents. The client comprises a browser 2, a component 6 for handling SOAP-requests and responses (SOAP-Client) that communicates with the SOAP-Web-Server, and preferably (not required) a component 4 allowing updating of configuration documents (configuration component) that may be provided by the Web-Server. The basic method for configuration of the secure electronic vault Web-Service based on that basic architecture may be described as follows: The client 1 generates a SOAP-configuration request via its SOAP-client 6. The SOAP-configuration request is signed by the client's private key or digital signature and additionally contains information indicating "configuration or customization". The Web-Server that hosts that Web-Service preferably can be accessed only by one single HTTP-access port (first filter). All other incoming requests are automatically discarded by the HTTP-Web-Server 10. Furthermore, the HTTP-Web-Server 10 accepts only SOAP-requests (second filter). The HTTP-Web-Server 10 receives that SOAP-request, passes it via the Application Web-Server 12 to the SOAP-Web-Server 8 that routes it to the Access Control Manager 14 that executes an authentication check (third filter). In general the Access Control Manager 14 preferably verifies all incoming SOAP requests using digital signature or keys in the header, inhibits any non-authorized access to the secure electronic vault, manages local certificates, provides communication with Certificate of Authority using OCSP (Online Certificate Status Protocol), manages access policies for safe boxes, and audit logs for all unauthorized access attempts. If authentication is successful the Access Control Manager 14 forwards the SOAP-request to a Configuration Tool 16 that provides access to the configuration data file providing the current configuration status of a certain client's secure electronic vault Web-Service and forwards it via the Access Control Manager 14 and the SOAP-Web-Server 8 as a part of a SOAP-Response to the client.

Figure 4:
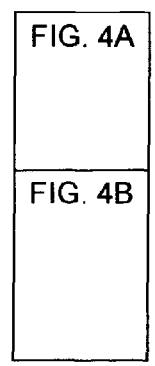
FIG. 4 shows a detailed floating diagram of the method steps executed by the basic architecture of the invention as shown in FIG. 3.
Figure 4B:
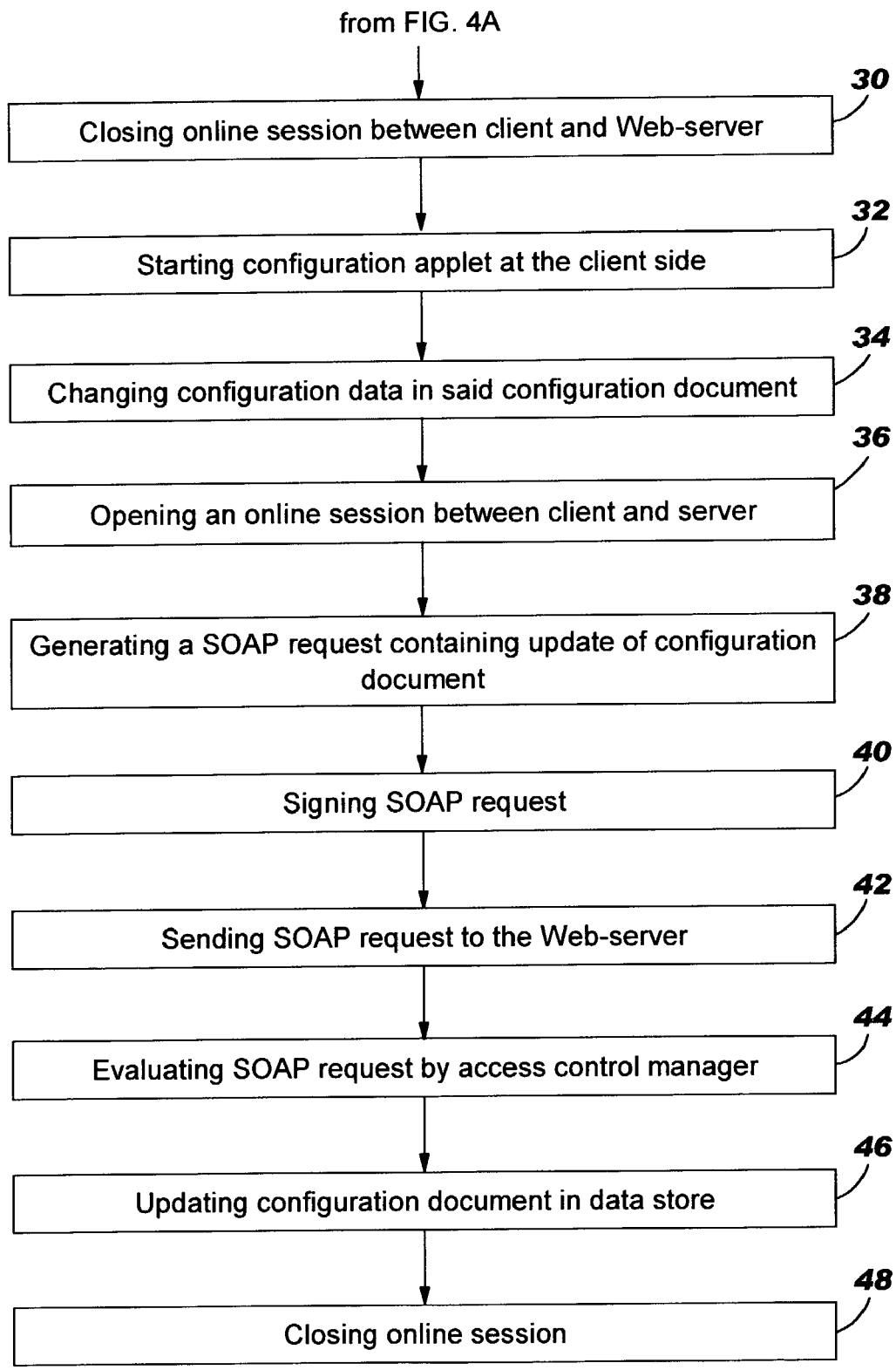

FIG.4 shows a detailed floating diagram of the method steps executed by the basic architecture of the invention as shown in FIG. 3.

The online session between the client and Web-Server is established by the client prior to the client's request using the HTTP communication protocol (10). Then, the client, especially client SOAP-Client, generates a SOAP-request containing a data element indicating "configuration" of a requested sensitive Web-Service preferably a secure electronic vault Web-Service (12). That SOAP-request is signed by client's private key or digital signature. That request is routed to the Web-Server configuration program via HTTP-Web-Server, Application-Web-Server, SOAP-Web-Server, and Access Control Manager all located at the Web-Server side (14, 16). The Access-Control Manager executes an authentication check and if successful forwards that request to the configuration program. Furthermore, the Access Control Manager controls the access rights to the sensitive information stored by the secure electronic vault Web-Service by using the information in the configuration document. The configuration program is preferably implemented as a Java Session Bean session. The Java Session Bean responds to the client request by sending a Java applet containing a configuration program that assists the client by the configuration of his requested Web-Service (18). The Java applet is sent as a part of a SOAP-request to the client (22). Preferably that SOAP-request is signed by Web-Server's key, e.g. Web-Server's private key or symmetric key exchanged between client and Web-Server. Furthermore, the configuration program additionally provides the current configuration of the secure electronic vault Web-Service in the form of a configuration data file preferably laid down as an XML document to the client (24,26,). The configuration document is sent as part of a SOAP—response that is preferably signed with a key (asymmetric or symmetric) (28). Now the online-session between client and Web-Server is closed and the further steps are executed offline at the client side (30). The client receiving both responses from the Web-Server starts the applet via its browser and makes changes by means of the applet providing a configuration tool at the configuration document (32,34). Typical updates of the secure electronic vault may give other users access to specific documents, remove access rights, lock documents for any access. The online session between client and Web-Server is again reestablished by the client prior to the client's SOAP-request (36). The updated configuration document is sent via SOAP-client as a part of a SOAP-request to the Web-Server providing the Web-Service (38,40,42). The SOAP-request is then provided to the Access-Control Manager via SOAP Web-Server, HTTP Web-Server, and Application Web-Server all located at the Web-Server side (44). Preferably, the SOAP-request is signed by a key (asymmetric or symmetric key). The Access-Control-Manager checks the authentication of the SOAP-request and if successful forwards the SOAP-request to the session bean handling updates of the configuration data file stored in the data base (46, 48). In another embodiment of the present invention there is no need for providing an additional configuration applet from the Web-Server to the client. Instead the browser located at the client provides the functionality to update the configuration data file provided by the Web-Web-Server.

Figure 5:
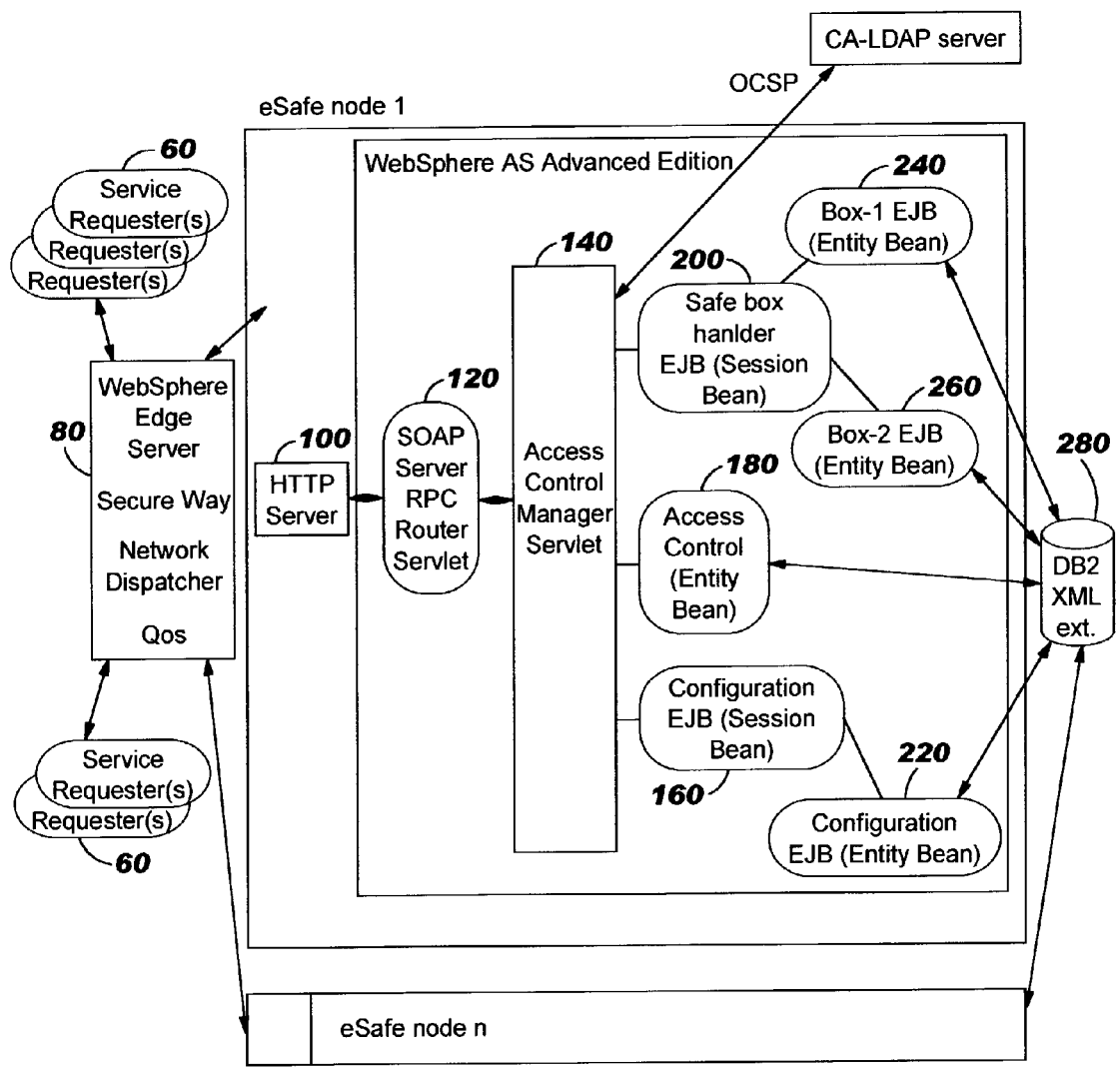
FIG. 5 shows a specific implementation for a secure configuration of a Web-Service in accordance with the present invention.

FIG.5 shows a specific implementation for a secure configuration for Web-Service in accordance with the present invention. The sensitive Web-Service is a secure electronic vault for securely storing any kind of electronic information. The sensitive Web-Service can be configured by user/client for its specific needs.

Service Requester 60 components are client applications that request the Web-Services of the secure electronic vault. They use the SOAP protocol and HTTP for communication. These client applications are normally part of bigger applications installed at the client side.

For scalability and availability purposes the secure electronic vault Web-Service uses the WebSphere Edge Weber Server 80, described below:

The IBM WebSphere(TM) Edge Server 80 (or simply Edge Server) helps information technology administrators provide better service both to users who access documents stored on the enterprise's server machines and to their internal users who access the Internet. In other words, Edge Server 80 helps both to host Web-accessible content and to provide Internet access more efficiently and economically. The name Edge Server indicates that the software usually runs on machines that are close (in a network configuration sense) to the boundary between an enterprise's intranet and the Internet.

The Edge Server 80 includes two main components that provide complementary functionality: the Caching Proxy and the Network Dispatcher.

The Caching Proxy component intercepts data requests from end users (service requesters), retrieves the requested information from content-hosting machines, and delivers it back to the end users. Most commonly, the requests are for documents stored on Web server machines (also called origin servers or content hosts) and delivered via the HyperText Transfer Protocol (HTTP).

The Network Dispatcher also intercepts data requests from end users, but rather than actually retrieving data, it forwards the request to the Web-Server machine that is currently best able to fill the request. In other words, it load balances incoming requests among a defined set of machines that service the same type of requests. A form of load balancer is sometimes termed a sprayer because it divides up an incoming stream of requests and distributes them to the machines that service them. The Network Dispatcher can distribute requests to many types of servers, including both HTTP origin servers and Caching Proxy machines. If desired, you can write rules that specify the criteria used by the Network Dispatcher when determining which server can best handle a request.

IBM Secure Way Boundary Server provides protection for Internet-based business transactions through the use of firewall, virtual private networking, and content-filtering technologies.

For availability and scalability reasons the secure electronic vault application is configurable to run in multiple nodes. Depending on the installation needs, these nodes can run on a single machine, on a single machine with multiple processors and on different machines. The distribution of requests is handled by the network dispatcher, described earlier. This multi-node concept is facilitated by IBM's Websphere Application Servers ability to provide workload management (WLM).

In this scenario the so-called cloning concept is shown. Cloning is a mechanism provided by the WebSphere Administration system, that allows for the creation of multiple copies of an object such as an application server. The clones can be instantiated on multiple nodes, and it is also possible to instantiate multiple clones on the same node.

The nodes may be described as follows:

IBM HTTP Server 100

The IBM HTTP Server 100 communicates requests coming from a requester to the IBM WebSphere application server. The HTTP server 100 can be configured to allow HTTP requests on a specific port only.

IBM WebSphere Application Server (Advanced Edition)

The Application Server in WebSphere is the process that is used to run servlet and/or EJB-based applications, providing both the servlet run-time components (Servlet Engine, Web applications) and EJB run-time (EJB container).

SOAP Server/RPC Router servlet 120

The SOAP Web-Server is a component from SOAP that handles SOAP requests and responses. It is implemented as a servlet. It is a standard component of the SOAP runtime environment.

Access Control Manager 140

The secure electronic vault Access Control Manager's main task is to validate the authentification and authorization of the digitally signed SOAP-Messages. It uses a Certification Authority for these validations (CA-LDAP server). Furthermore it contains a filter component for identifying and discarding non-valid requests, especially non-SOAP requests.

Depending on the request, the Access Control Manager 140 then calls the appropriate components, like the Safe Box Handler, a Session Bean 200, that calls an Entity Bean 220, 240,260. The Entity Bean 220,240,260 itself is responsible for performing the action requested, e.g. store configuration document, update configuration document. For Access Control Information that is not in the CA (e.g. A user profile) an Entity bean 180 receives the information directly from the database 280.

DB2 XML Extender

In this setup the DB2 XML Extender is used together with DB2 to serve as the database for the XML configuration documents, that the requesters want to store in the secure electronic vault. DB2 XML Extender serves as a repository for XML documents and their document type definitions (DTDs). It provides the option to store the entire configuration document as an XML user-defined column or to decompose the configuration document into multiple tables and columns. Fast search using indices is provided for XML elements and attributes.

The entity beans communicate via JDBC with the DB2 database.

Figure 6A:
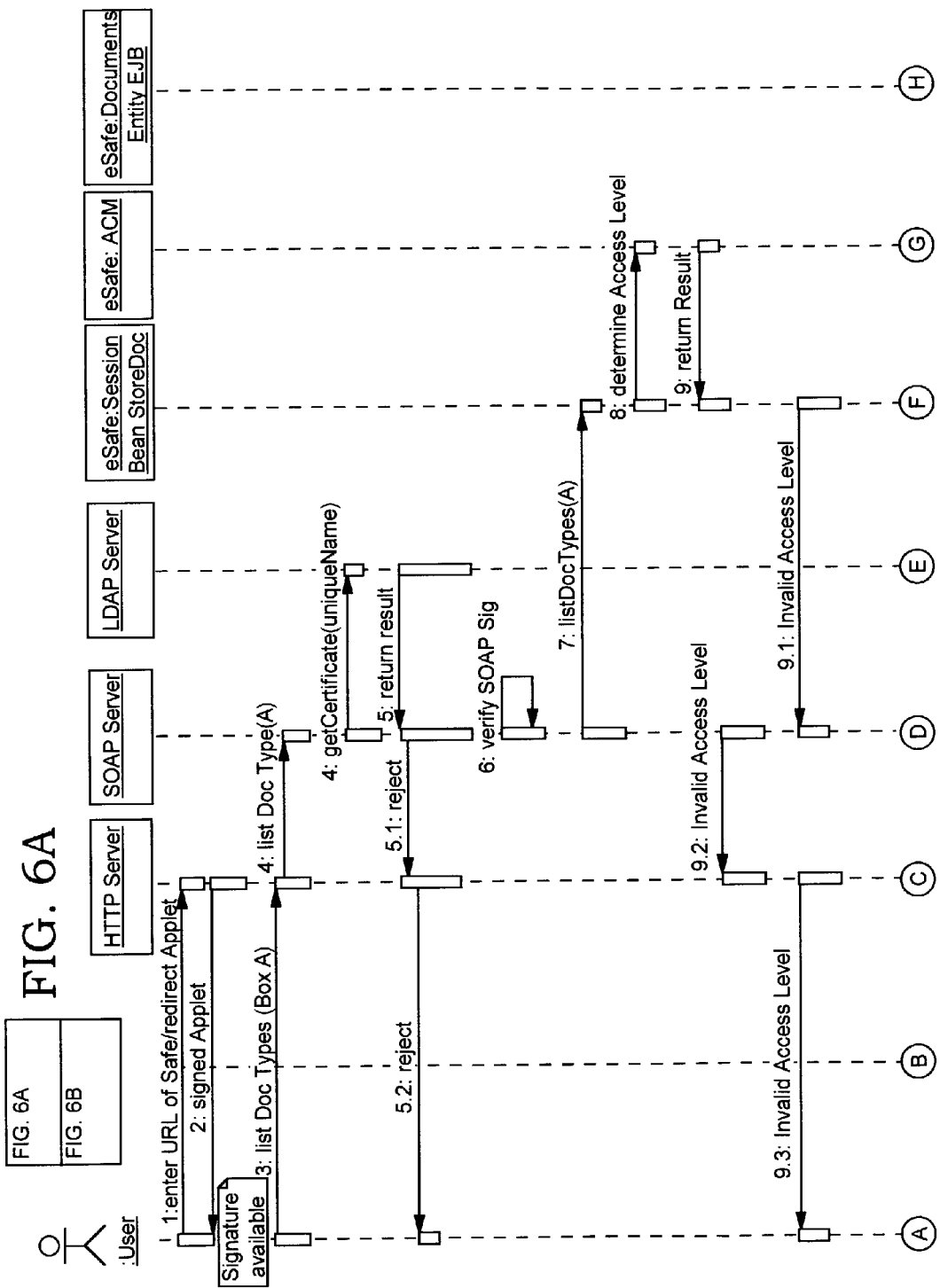
FIG. 6 shows an interaction diagram for the specific implementation of the present invention as shown in FIG. 4.

FIG. 6 shows an interaction diagram for the specific implementation of the present invention as shown in FIG. 4. The client system addresses a HTTP-Web-Server by its URL (1). The HTTP-Web-Server returns a signed applet allowing configuration of a requested Web-Service (2). The client system then sends a signed SOAP-request asking for a list of available configuration documents which is passed from the HTTP-Web-Server to the SOAP-Web-Server (4). If the user is unknown the request is rejected (5.1/5.2). The SOAP-Web-Server verifies user's signature using user certificate from the LDAP-Web-Server if the certificate is not already available at the Web-Server system (6). The request for a list is then passed to the configuration session bean (7). The configuration session bean checks via the Access Control Manager whether the user is allowed to issue that request (8). The Access Control Manager returns result (9). If the result is negative the request is terminated (9.1/9.3). If the request is positive the request is passed to an Entity bean having direct access to the database storing configuration documents (10). The list is sent as an XML document to the client system (11). The user selects the configuration to be changed out the list (12) and the selected XML document is sent to the user as part of a SOAP-message (13). By means of the configuration applet the configuration document can be changed (14). A signed SOAP-request containing the updated XML document is sent to the session bean requesting to store the changes in the data base (15). Confirmation of changes is returned to the user (16).

In summary, this invention avoids the necessity to logon to such a sensitive Web-Server if configuration changes to an installed Web-Service are required. The sensitive Web-Server offers only one single HTTP-access port. Furthermore, only signed SOAP-requests will be accepted by the HTTP-Web-Server. All other incoming requests will be discarded by applying specific filter mechanisms provided by the HTTP-Web-Server. In a case of required configuration changes, the client is sending a signed SOAP-request to the Web-Server requesting the configuration document to be changed. The changes of the configuration document are accomplished exclusively offline and the updated configuration document is sent as a part of a signed SOAP-request to the Web-Server. The updated configuration document is used by a program at the Web-Web-Server side that receive that document and configures the Web-Service according to the updated configuration document.

What is claimed:

1. A server system for providing a sensitive Web-Service to a client system, comprising:
  a communication component for establishing communication with a client SOAP-communication component of the client system,
  a data store for storing a current configuration data file providing access rights to said sensitive Web-Service,
  a filter component for identifying and discarding non-valid requests to the communication component,
  an access control manager component for authenticating all incoming SOAP-requests from the client system requesting modification of said current configuration data file, and
  an updating component for updating said current configuration data file with an updated configuration data file, the updated configuration data file being offline updated by the client system.

2. A system according to claim 1, wherein the communication between said server and the client system is based on a SOAP-HTTP protocol.

3. A system according to claim 1, wherein said filter component accepts SOAP-HTTP requests only.

4. A system according to claim 2, wherein said filter component further provides a single HTTP-Port to said server system.

5. A system according to claim 1, wherein said access control manager having an interface to a system of a Certification Authority providing access to user certificates.

6. A system according to claim 1, wherein said current configuration data file is an XML-file.

7. A system according to claim 5, wherein said XML-file is sent to said client system as part of a SOAP-HTTP response.

8. A system according to claim 1, further comprising a client configuration component allowing updating of the updated configuration data file at said client system, wherein said client configuration component is sent to said client system after a client request.

9. A system according to claim 1, wherein said sensitive Web-Service is a secure electronic vault Web-Service.

10. A system according to claim 6, wherein said XML-file is stored in a data store.

11. A client system for configuration of a sensitive Web-Service provided by a server system having
  a communication component for establishing communication with a client SOAP-communication component of the client system,
  a data store for storing a current configuration data file providing access rights to the sensitive Web-Service,
  a filter component for identifying and discarding non-valid requests to the communication component,
  an access control manager component for authenticating incoming SOAP-requests from the client system requesting modification of the current configuration data file,
  an updating component for updating the current configuration data file with an updated configuration data file, the updated configuration data file being offline updated by the client system, wherein
  the client system is connected via a data link to the server system, the client system comprising:
  a SOAP-communication component for establishing communication with the communication component of the server system,
  a browser component,
  a client configuration data file containing access rights for the sensitive Web-Service, and
  a client configuration component for updating the client configuration data file to create the updated configuration data file.

12. A method for configuration of a sensitive Web-Service provided by a server system, the server system having
  a communication component for establishing communication with a client SOAP-communication component of a client system,
  a current configuration data file providing access rights to the sensitive Web-Service,
  a filter component for identifying and discarding non-SOAP requests to the communication component, an access control manager component for authenticating incoming SOAP-requests from the client system requesting modification of the current configuration data file, an updating component for updating the current configuration data file with an updated configuration data file, the updated configuration file being offline updated by a configuration component of the client system, wherein the method at the server system side comprises the steps of:

receiving a client request requesting modification of the current configuration data file, examining the client request at the filter component for use of a valid access port to the server and for the use of a valid type of request, examining authentication information within the SOAP-request at the access control manager, accessing the current configuration data file, sending a SOAP-response to the client system containing the current configuration data file and authentication information of the server system, receiving a second client SOAP-request for updating the configuration data file containing client authentication information and the updated configuration data file, examining the second client SOAP-request at the filter component for use of the valid access port to the server and for the use of the valid type of request, examining the authentication information of the second client SOAP-request at the access control manager, and updating the current configuration data file with the updated configuration data file.

13. A method according to claim 12, wherein the communication between the client and the server system is based on a SOAP/HTTP protocol.

14. A method according to claim 13, wherein the authentication information is a private key.

15. A method according to claim 13, wherein the configuration component is a browser.

16. A method according to claim 12, wherein content of the client SOAP-request and the SOAP-response from the server is encrypted.

17. A method according to claim 12, wherein the configuration component is an Java applet provided by the server system to the client system before a configuration request is sent.

18. A method according to claim 12, wherein the current configuration data file is a XML file.

19. A method according to claim 12, wherein the sensitive Web-Service is a secure electronic vault Web-Service.

20. A computer program product stored in the internal memory of a digital computer, containing computer program code to execute the method in accordance with any of claims 12 to 19.

* * * * *